US010285215B2

(12) United States Patent
Karia et al.

(10) Patent No.: US 10,285,215 B2
(45) Date of Patent: May 7, 2019

(54) DYNAMIC QUALITY OF SERVICE (QOS) BASED CHANNEL IN WIRELESS NETWORK

(71) Applicant: INTERNATIONAL BUSINESS MACHINES CORPORATION, Armonk, NY (US)

(72) Inventors: Jigneshkumar K. Karia, Maharashtra (IN); Gandhi Sivakumar, Bentleigh (AU); Rambabu Yerra, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 15/299,801

(22) Filed: Oct. 21, 2016

(65) Prior Publication Data

US 2018/0116006 A1 Apr. 26, 2018

(51) Int. Cl.
*H04W 76/20* (2018.01)
*H04W 24/08* (2009.01)
*H04W 28/02* (2009.01)
*H04W 76/11* (2018.01)

(52) U.S. Cl.
CPC .......... *H04W 76/20* (2018.02); *H04W 24/08* (2013.01); *H04W 28/0268* (2013.01); *H04W 76/11* (2018.02); *H04W 28/0205* (2013.01)

(58) Field of Classification Search
CPC .................................................... H04W 76/20
USPC .......................................................... 370/252
See application file for complete search history.

(56) References Cited

U.S. PATENT DOCUMENTS

| 8,775,631 | B2 | 7/2014 | Luna | |
|---|---|---|---|---|
| 2003/0182419 | A1* | 9/2003 | Barr | H04W 36/06 709/224 |
| 2004/0024854 | A1* | 2/2004 | Mandal | H04L 41/00 709/223 |
| 2007/0099576 | A1* | 5/2007 | Vukovic | H04W 36/02 455/67.13 |
| 2010/0279653 | A1* | 11/2010 | Poltorak | H04M 15/00 455/410 |
| 2012/0057478 | A1 | 3/2012 | Brannstrom et al. | |
| 2012/0307885 | A1* | 12/2012 | Agarwal | H04W 72/1242 375/240.02 |
| 2013/0242903 | A1 | 9/2013 | Narkar et al. | |

(Continued)

FOREIGN PATENT DOCUMENTS

WO 2014193842 A1 12/2014

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Samina F Choudhry
(74) *Attorney, Agent, or Firm* — Robert Shatto; Hye Jin Lucy Song; Heslin Rothenberg Farley & Mesiti P.C.

(57) ABSTRACT

Methods, computer program products, and systems are presented. The methods include, for instance: attaching a user equipment to a communication network; monitoring usage characteristics of the user equipment; and assigning a new communication channel for the user equipment based on the usage characteristics.

18 Claims, 5 Drawing Sheets

(56) References Cited

U.S. PATENT DOCUMENTS

2016/0080207 A1    3/2016   Parkash et al.

OTHER PUBLICATIONS

Esmailpour, Amir, et al., "Dynamic QoS-Based Bandwidth Allocation Framework for Broadband Wireless Networks", IEEE Transactions on Vehicular Technology, vol. 60, No. 6, Jul. 2011, 11 pgs.
An, Fu-Tai, et al., "A New Dynamic Bandwidth Allocation Protocol With Quality of Service in Ethernet-Based Passive Optical Networks", eprint arXiv:1404.2413, Apr. 9, 2014, 5 pgs.

\* cited by examiner

DYNAMIC QUALITY OF SERVICE (QOS) BASED CHANNEL IN WIRELESS NETWORK

BACKGROUND

The present disclosure relates to wireless network technology, and more particularly to methods, computer program products, and systems for improving utilization and service quality of the air interface. In conventional wireless network environment, the air interface between a user equipment and a base station is determined by predefined quality-of-service classes and associated channels based on a subscription level of the user equipment.

SUMMARY

The shortcomings of the prior art are overcome, and additional advantages are provided, through the provision, in one aspect, of a method. The method for dynamically optimizing a communication channel includes, for example: attaching, by one or more processor of a computer, a user equipment to a communication network; ascertaining that the communication channel needs to be monitored and adjusted; monitoring usage characteristics of the user equipment; and assigning a new communication channel for the user equipment based on the usage characteristics from the monitoring.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
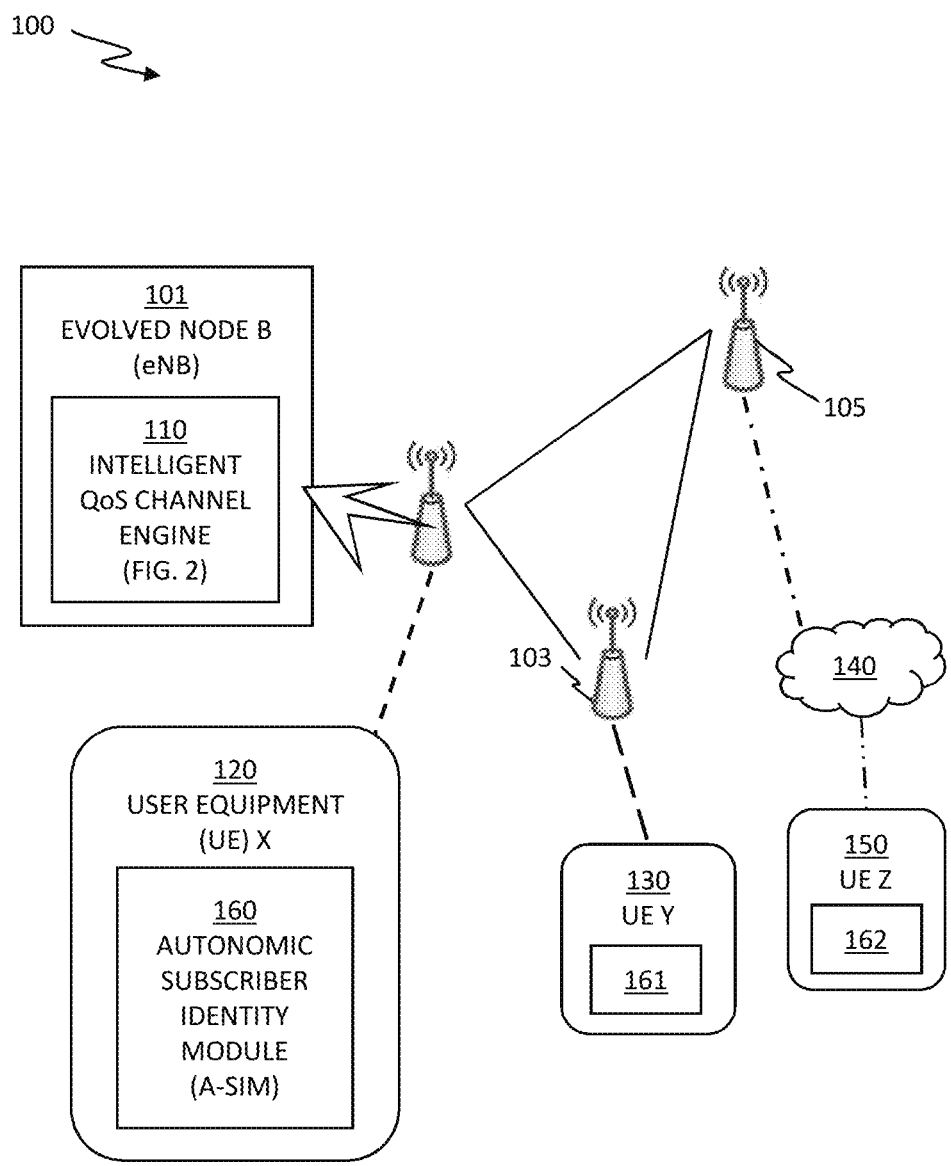
FIG. 1 depicts a system 100 for intelligent channel management, in accordance with one or more embodiments set forth herein.

FIG. 1 depicts a system 100 for intelligent channel management, in accordance with one or more embodiments set forth herein.

The system 100 for intelligent channel management is implemented as a part of a subscriber radio network providing mobile communication services. One example of the subscriber radio network may be a Long Term Evolution (LTE) network. The system 100 includes multiple Evolved Node B (eNB) 101, 103, and 105. Each of the multiple eNBs 101, 103, and 105 controls connectivity of user equipment in one or more cells, according to individual subscription agreements for the mobile communication services per user equipment. At least one of the multiple eNBs 101, 103, and 105 includes an intelligent quality-of-service (QoS) channel engine 110. The QoS channel engine dynamically assigns a radio channel having an optimal network bandwidth for each user equipment based on cognitive analysis of usage and mobility of each user equipment. In FIG. 1, the intelligent QoS channel engine 110 resides in a first eNB 101. A second eNB 103 and a third eNB 105 communicate with the intelligent QoS channel engine 110 of the first eNB 101 over the subscriber radio network.

A first user equipment (UE) X 120 is in a first cell controlled by the first eNB 101. Similarly, a second user equipment (UE) Y 130 is in a second cell controlled by the second eNB 103. A third user equipment (UE) Z 150 is in a third cell controlled by the third eNB 105, via a wireless access point (WAP) 140. The UEs 120, 130, and 150, respectively include an autonomic Subscriber Identity Module (A-SIM) 160, 161, and 162, which include respective subscription information of the UEs and facilitate respective QoS-based, dynamically-assigned wireless channels with respective eNBs 101, 103, and 105.

Conventional functionalities of a Subscriber Identity Module (SIM), or a SIM card/chip, include identifying a user equipment of a subscriber with base stations and connecting the user equipment to a wireless network by the base stations. With conventional SIMs in 4G networks, a user equipment is connected via a wireless channel based on predefined QoS classes and respectively associated subscription levels, regardless of a dynamic QoS need and usage pattern of a UE. In some embodiments of the present invention, the A-SIMs 160, 161, and 162 respectively identify the UEs 120, 130, and 150 by use of subscription information with the respective eNBs 101, 103, and 105, and provide access to the subscriber radio network via respective QoS-based, dynamically-assigned wireless channels.

Subscription information may include: (i) a subscriber identification, and (ii) a subscription level. The subscription information is stored in respective A-SIMs 160, 161, and 162 in the same manner as other information is stored in conventional SIMs. The QoS channels between the UEs 120, 130, and 150, and the eNBs 101, 103, and 105, have a respective bandwidth fit best for the characteristics of the usage and mobility of the respective UEs 120, 130, and 150, by use of the the intelligent QoS channel engine 110, in order to enhance quality of service (QoS) of the mobile communication services provided by the LTE network while optimizing bandwidth consumption.

One of the most prominent technological trends is the Internet connectivity in most of devices to send and receive data, as demonstrated by the Internet of Things (IoT), which must be supported by extensive network connectivity. The UEs, 120, 130, and 150, may be coupled to and serviced by the subscriber radio network via various connection mechanisms such as a direct individual wireless connection to the network via 4G mechanism, as in the connections between the first eNB 101 and the UE X 120, or between the second eNB 103 and the UE Y 130, or a series of connections as in the connection between the third eNB 105 and the UE Z 150 via an intermediary such as the WAP 140, or a WiFi® connection to the a femtocell access point and a wired network connection to the Internet, etc. (Wi-Fi is a registered trademark of Wi-Fi Alliance in the United States and other countries.) For example, the UE X 120, the UE Y 130, and the UE Z 150, may be, but are not limited to, a remotely controlled car, temperature sensors of a building climate control system, video sensors of a surveillance system, a remotely monitored generator, etc. The remotely controlled car may require constant and stable connection to control the movement of the car remotely as well as require a high volume data traffic to upload travel data periodically, such that the travel data may be collected and analyzed at a control station. The temperature sensors in the building climate control system may also need to upload a large volume of data periodically to control and to monitor operations of the building climate control system. The video sensors of the surveillance system may move around in public places, and need to upload the large volume of image data in near real time, and consequently, require a time sensitive high speed data channel to provide proper quality of service. The remotely monitored generator may be permanently located in one place, and accordingly, could be managed by a specific set of eNBs continuously without handovers.

As noted, technological trends including the IoT, cloud computing, etc., emphasize communicability of devices enormously. Further, machine-type user equipment as shown above may require higher levels of QoS than user equipment for an individual subscribers using services normally requiring high-speed communication channels such as multimedia online gaming (MMOG), mobile TV, Web 2.0, and other content streaming services. Also the machine-type user equipment data usage and a required QoS may dynamically change, thus dynamically adjusting and assigning QoS-based channel would improve quality of service (QoS) for the machine-type user equipment as well as bandwidth utilization of the subscriber radio network.

Figure 2:
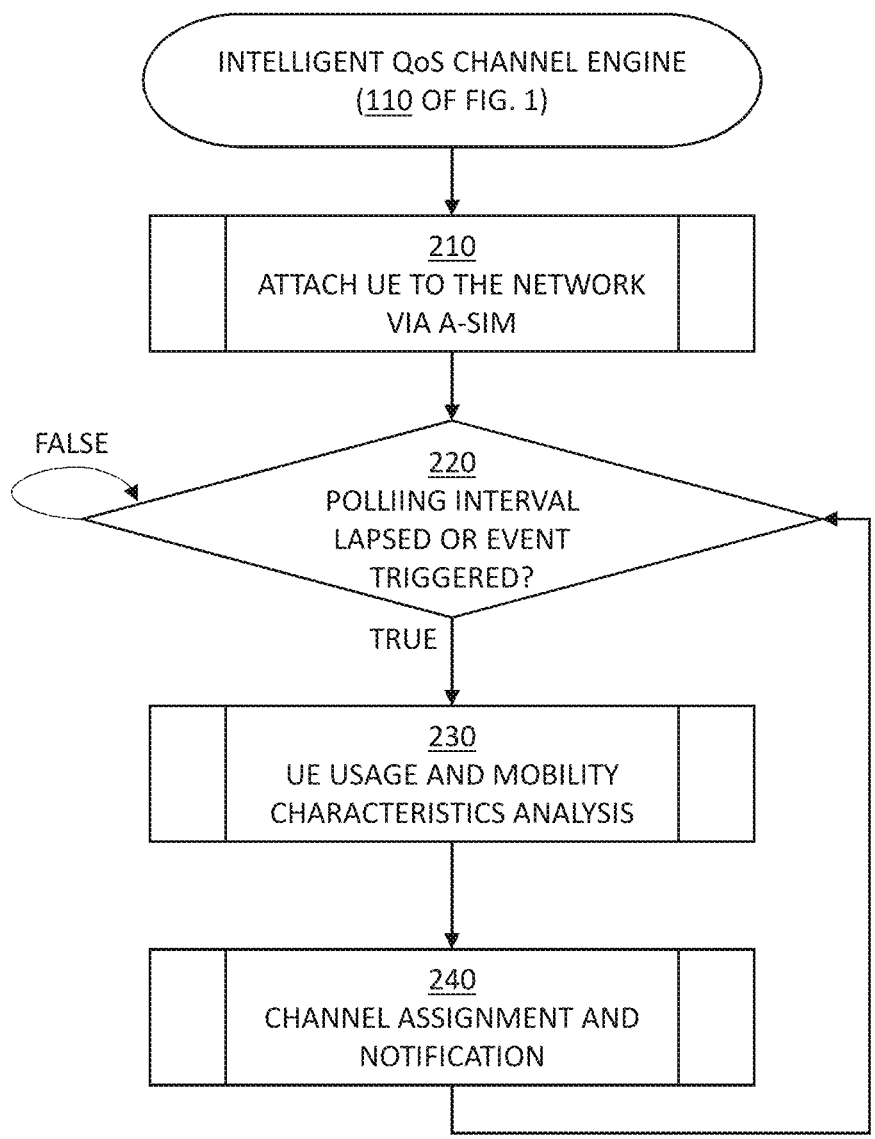
FIG. 2 depicts a flowchart performed by the intelligent QoS channel engine, in accordance with one or more embodiments set forth herein.

FIG. 2 depicts a flowchart performed by the intelligent quality-of-service (QoS) channel engine 110 of FIG. 1, in accordance with one or more embodiments set forth herein. In this example, the subscriber radio network is an LTE network.

In block 210, the intelligent QoS channel engine 110 attaches a user equipment (UE) to the LTE network by use of subscription information stored in the autonomic Subscriber Identity Module (A-SIM) 160. Prior to block 210, the UE is installed with a SIM card having the A-SIM 160 and is properly configured to access the LTE network. When the UE comes into a radio cell controlled by an eNB in which the intelligent QoS channel engine 110 operates, the eNB sends the request for the channel to access the LTE channel for the UE. The A-SIM 160 may be used for advanced user equipment (UE) that requires a QoS-based channel having dynamically adjustable bandwidth. In this embodiment of the present invention, the A-SIM 160 self-monitors and optimizes a channel requirements on the UE and sends a request for the QoS-based channel to a corresponding eNB only when the UE requires a new type of QoS channel. Then the intelligent QoS channel engine 110 proceeds with block 220.

In block 220, the intelligent QoS channel engine 110 determines if a polling interval had lapsed or an event triggering adjustment of a present channel provision had been reported from the A-SIM 160 of the user equipment. The polling interval specifies how often the A-SIM 160 within a radio cell controlled by each eNB should be polled for a channel adjustment. If the intelligent QoS channel engine 110 determines either the polling interval had lapsed or the event is triggered to adjust the present channel provision for the UE, then the intelligent QoS channel engine 110 proceeds with block 230. Otherwise the intelligent QoS channel engine 110 waits until the condition to proceed to block 230 as above is satisfied.

In block 230, the intelligent QoS channel engine 110 monitors and tracks usage and mobility characteristics of each UE in the radio cell associated with the eNB. In some embodiments of the present invention, the usage and mobility characteristics are recorded for later reference. The usage and mobility characteristics may include, but are not limited to: (i) when data is downloaded to the user equipment; (ii) when data is uploaded from the user equipment; (iii) how much data is downloaded to the user equipment; (iv) how much data is uploaded from the user equipment; and (v) the number of handovers amongst eNBs serving the user equipment. In one embodiment of the present invention, respective A-SIMs 160 may collect usage and mobility data within the UE and pass the data on to the eNB upon being polled. Then the intelligent QoS channel engine 110 proceeds with block 240.

In block 240, the intelligent QoS channel engine 110 assigns a new channel with a new bandwidth according to a template optimized for the usage and mobility characteristics of each UE as analyzed in block 230. Any previously assigned channel for the UE would be de-provisioned after the new channel was assigned. The intelligent QoS channel engine 110 subsequently notifies all of the eNB governed by the intelligent QoS channel engine 110, upper layers of the LTE network, and routing elements with any changes in channel assignments such that the UE may communicate with the LTE network via the new channel. Then the intelligent QoS channel engine 110 loops back to block 220 for the next polling interval or the next triggering event.

Certain embodiments of the present invention may offer various technical computing advantages, including dynamic adjustment of quality-of-service (QoS) requirement for radio channels of machine-type user equipment based on usage and mobility of the machine-type user equipment. Certain embodiments of the present invention implement the dynamic QoS channels by use of an autonomic subscriber identity module (A-SIM) on the machine-type user equipment as well as an intelligent QoS engine operating on an Evolved Node B (eNB) of a long term evolution (LTE) network. Certain embodiments of the present invention optimizes utilization of the subscriber radio network by de-provisioning unused portion of the network bandwidth by dynamic adjustment of the QoS channels.

Some embodiments of the present invention recognize that usage contexts for machine communication equipment drives a dynamic QoS requirement. By determining the QoS requirement at any given time, network carriers (operators) are able to efficiently allocate bandwidth instead of offering a dedicated QoS channel at all times. In some embodiments of the present invention, an intelligent QoS provider allocates bandwidth based on the context of the application or system requesting the bandwidth. Context, as used here, refers to the behavior and/or nature of the usage of the SIMs.

Figure 3:
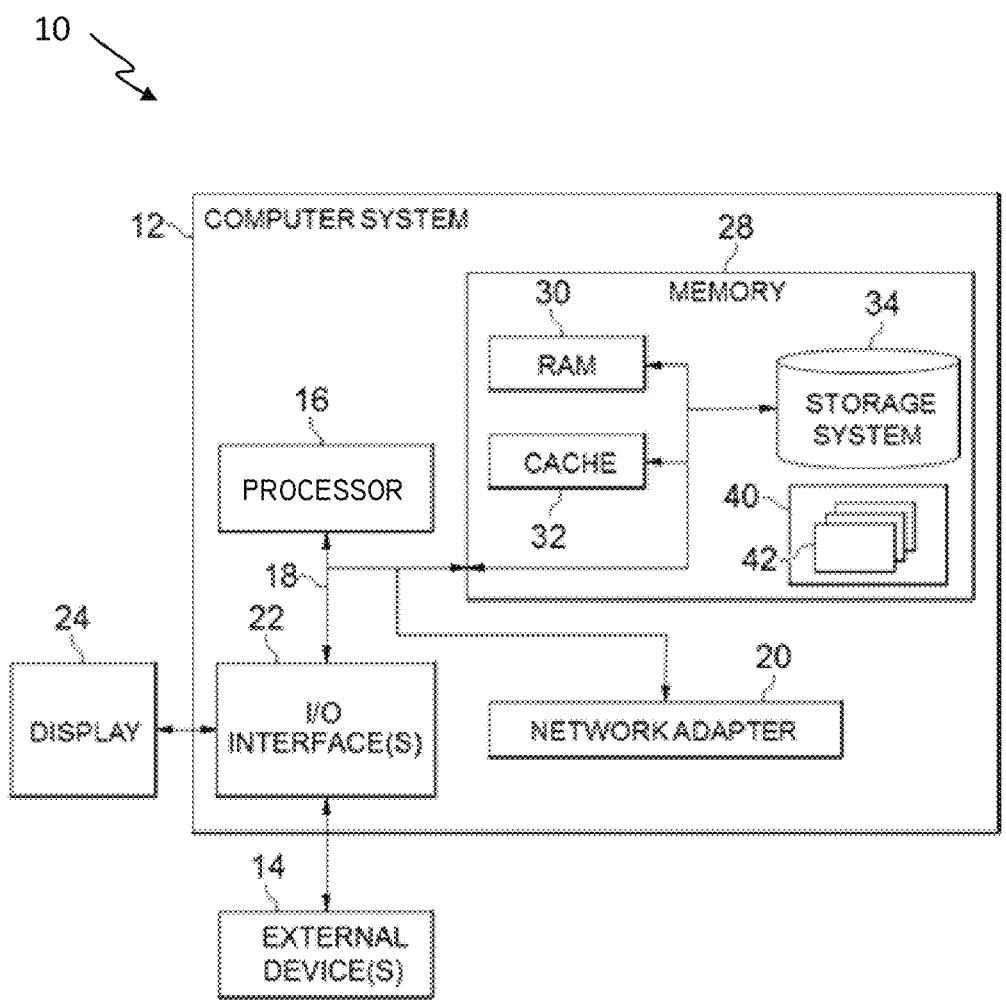
FIG. 3 depicts a cloud computing node according to an embodiment of the present invention.
Figure 4:
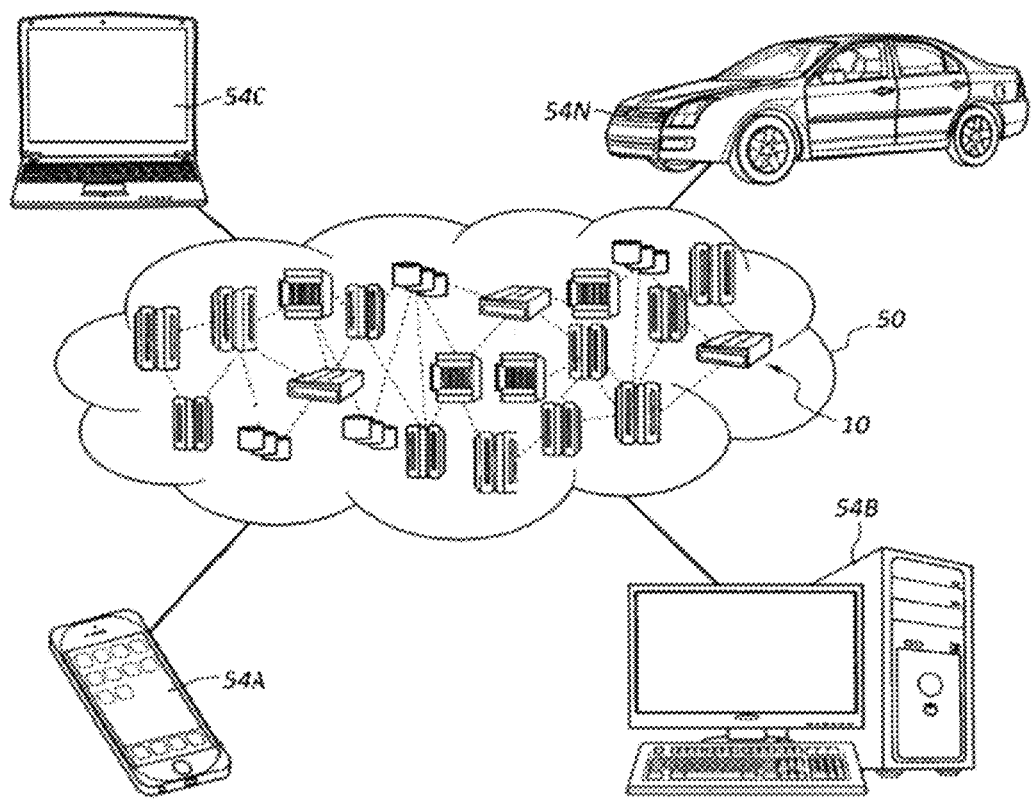
FIG. 4 depicts a cloud computing environment according to an embodiment of the present invention.
Figure 5:
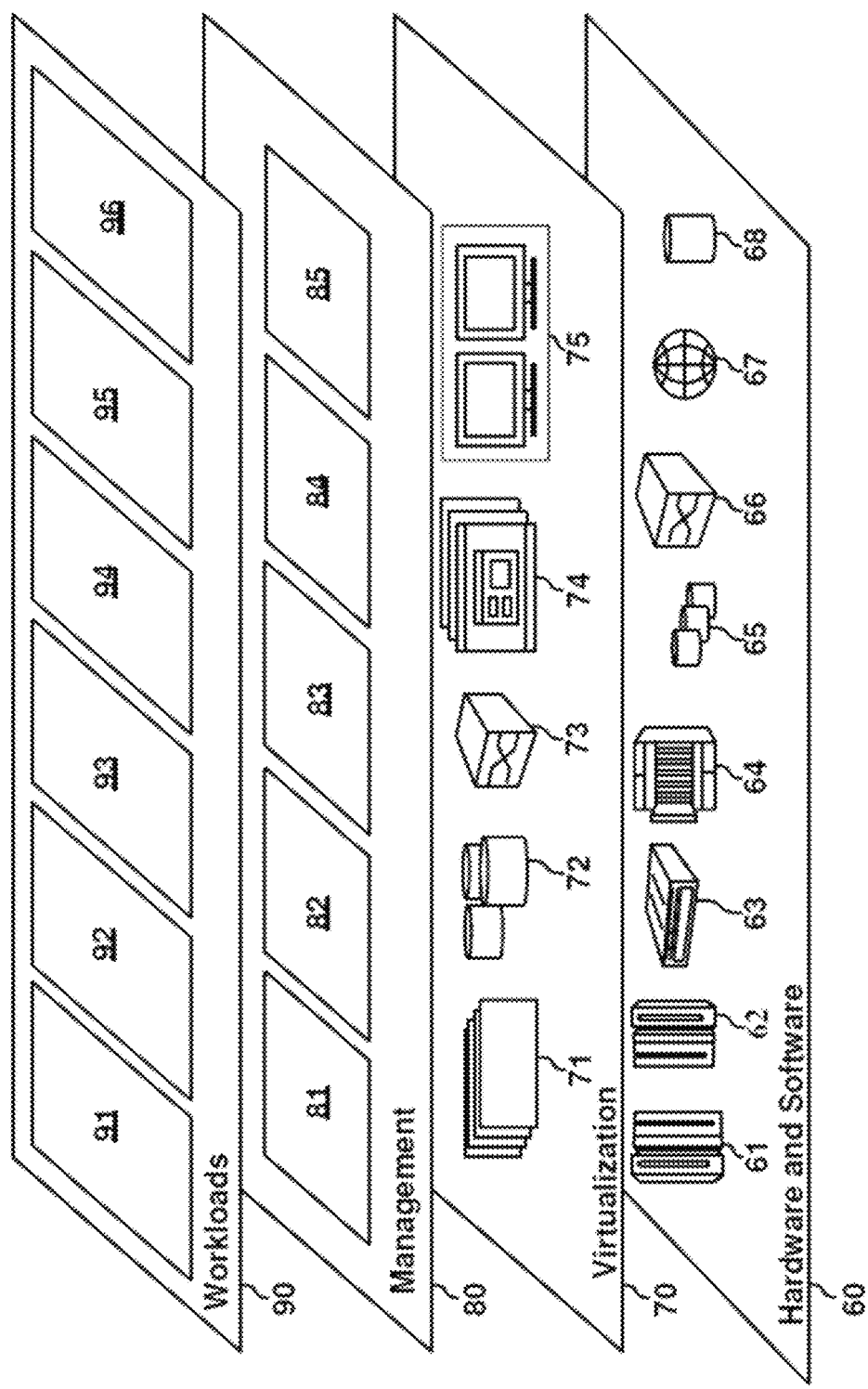
FIG. 5 depicts abstraction model layers according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the intelligent QoS channel engine 110 of FIG. 1. Program processes 42, as in the intelligent QoS channel engine 110 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the intelligent QoS channel engine 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have"

(and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for dynamically optimizing a communication channel, comprising:
    attaching, by one or more processor of a computer, a user equipment to a communication network;
    ascertaining that the communication channel needs to be monitored and adjusted;
    monitoring usage characteristics of the user equipment, comprising:
        tracking and recording the usage characteristics of the user equipment, wherein the usage characteristics of the user equipment comprises: (i) when data is downloaded to the user equipment; (ii) when data is uploaded from the user equipment; (iii) how much data is downloaded to the user equipment; (iv) how much data is uploaded from the user equipment; and (v) the number of handovers amongst Evolved Nodes B (eNBs) serving the user equipment; and
    assigning a new communication channel for the user equipment based on the usage characteristics from the monitoring, wherein the communication network is a subscriber radio network comprising a plurality of radio cells controlled by a plurality of eNBs, wherein connectivity of one or more user equipment within each radio cell is controlled by an Evolved Node B (eNB) corresponding to the respective radio cells, and wherein the one or more processor operates on one of the plurality of eNBs.

2. The computer implemented method of claim 1, the attaching comprising:
    retrieving a subscriber identification and a subscription level from an autonomic subscriber identity module (A-SIM) of the user equipment; and
    providing access to the communication network for the user equipment via the communication channel.

3. The computer implemented method of claim 1, the ascertaining comprising:
    determining that a polling interval for usage and mobility of the user equipment has lapsed.

4. The computer implemented method of claim 1, the ascertaining comprising:
    determining that an event triggering adjustment of the communication channel has occurred.

5. The computer implemented method of claim 1, the monitoring comprising:
    tracking and recording volume of data traffic, time of the data traffic, and mobility of the user equipment as the usage characteristics of the user equipment.

6. The computer implemented method of claim 1, the assigning comprising:
    selecting the new communication channel associated with a template of the usage characteristics from the monitoring;
    providing access to the communication network for the user equipment via the new communication channel; and
    releasing resources of the communication channel for the user equipment.

7. The computer implemented method of claim 6, the providing further comprising:
    notifying routing elements and controlling elements of the communication network of the new communication channel such that the user equipment communicates with the communication network via the new communication channel.

8. A computer program product comprising:
    a non-transitory computer readable storage medium readable by one or more processor and storing instructions for execution by the one or more processor for performing a method for dynamically optimizing a communication channel, comprising:
        attaching, by the one or more processor, a user equipment to a communication network;
        ascertaining that the communication channel needs to be monitored and adjusted;
        monitoring usage characteristics of the user equipment, comprising:
            tracking and recording the usage characteristics of the user equipment, wherein the usage characteristics of the user equipment comprises: (i) when data is downloaded to the user equipment; (ii) when data is uploaded from the user equipment; (iii) how much data is downloaded to the user equipment; (iv) how much data is uploaded from the user equipment; and (v) the number of handovers amongst Evolved Nodes B (eNBs) serving the user equipment; and
        assigning a new communication channel for the user equipment based on the usage characteristics from the monitoring, wherein the communication network is a subscriber radio network comprising a plurality of radio cells controlled by a plurality of eNBs, wherein connectivity of one or more user equipment within each radio cell is controlled by an Evolved Node B (eNB) corresponding to the respective radio cells, and wherein the one or more processor operates on one of the plurality of eNBs.

9. The computer program product of claim 8, the attaching comprising:
    retrieving a subscriber identification and a subscription level from an autonomic subscriber identity module (A-SIM) of the user equipment; and providing access to the communication network for the user equipment via the communication channel.

10. The computer program product of claim 8, the ascertaining comprising:
determining that an event triggering adjustment of the communication channel has occurred.

11. The computer program product of claim 8, the assigning comprising:
selecting the new communication channel associated with a template of the usage characteristics from the monitoring;
providing access to the communication network for the user equipment via the new communication channel; and
releasing resources of the communication channel for the user equipment.

12. The computer program product of claim 11, the providing further comprising:
notifying routing elements and controlling elements of the communication network of the new communication channel such that the user equipment communicates with the communication network via the new communication channel.

13. A system comprising:
a memory;
one or more processor in communication with memory; and
program instructions executable by the one or more processor via the memory to perform a method for dynamically optimizing a communication channel, comprising:
attaching, by the one or more processor, a user equipment to a communication network;
ascertaining that the communication channel needs to be monitored and adjusted;
monitoring usage characteristics of the user equipment, comprising:
tracking and recording the usage characteristics of the user equipment, wherein the usage characteristics of the user equipment comprises: (i) when data is downloaded to the user equipment; (ii) when data is uploaded from the user equipment; (iii) how much data is downloaded to the user equipment; (iv) how much data is uploaded from the user equipment; and (v) the number of handovers amongst Evolved Nodes B (eNBs) serving the user equipment; and
assigning a new communication channel for the user equipment based on the usage characteristics from the monitoring, wherein the communication network is a subscriber radio network comprising a plurality of radio cells controlled by a plurality of eNBs, wherein connectivity of one or more user equipment within each radio cell is controlled by an Evolved Node B (eNB) corresponding to the respective radio cells, and wherein the one or more processor operates on one of the plurality of eNBs.

14. The system of claim 13, the attaching comprising:
retrieving a subscriber identification and a subscription level from an autonomic subscriber identity module (A-SIM) of the user equipment; and
providing access to the communication network for the user equipment via the communication channel.

15. The system of claim 13, the ascertaining comprising:
determining that an event triggering adjustment of the communication channel has occurred.

16. The system of claim 13, the assigning comprising:
selecting the new communication channel associated with a template of the usage characteristics from the monitoring;
providing access to the communication network for the user equipment via the new communication channel, by provisioning the new communication channel for the user equipment and by notifying routing elements and controlling elements of the communication network of the new communication channel; and
releasing resources of the communication channel for the user equipment.

17. The computer implemented method of claim 1, the attaching comprising:
retrieving a subscriber identification and a subscription level for the subscriber radio network from an autonomic subscriber identity module (A-SIM) of the user equipment; and
providing access to the subscriber radio network for the user equipment via the communication channel between the user equipment and one of eNBs controlling a radio cell in which the user equipment is located.

18. The computer implemented method of claim 1, wherein the user equipment includes user equipment selected from the group consisting of: individual user device using high-volume, high-speed data traffic services, and machine-type user equipment that requires high level of quality of service.

\* \* \* \* \*